United States Patent [19]

McAllister

[11] 4,276,517
[45] Jun. 30, 1981

[54] CO PUMPED CO2 16 MICRON LASER

[75] Inventor: Gary L. McAllister, Richland, Wash.

[73] Assignee: Jersey Nuclear-Avco Isotopes, Inc., Bellevue, Wash.

[21] Appl. No.: 861,985

[22] Filed: Dec. 19, 1977

[51] Int. Cl.³ .............................................. H01S 3/091
[52] U.S. Cl. .......................... 331/94.5 P; 331/94.5 G
[58] Field of Search ...................... 331/94.5 G, 94.5 P; 330/4.3

[56] References Cited

U.S. PATENT DOCUMENTS 4,053,852 10/1977 Krupke ........................... 331/94.5 G
4,136,317 1/1979 Stregack et al. ................ 331/94.5 G

OTHER PUBLICATIONS

D. K. Rice, "Carbon Monoxide Spectral Line Selection Studies", *Northrup Corporation Technical Report*, NLSD 72-13R, Aug. 1972, pp. 44-55.

R. M. Osgood, Jr., "Optically Pumped 16 μm CO2 Laser" *Applied Physics Letters*, vol. 28, No. 6, Mar. 15, 1976, pp. 342-347.

T. J. Manuccia et al., "14- and 16-μ Gasdynamic CO2 Lasers", *Applied Physics Letters*, vol. 29, No. 6, Sep. 15, 1976, pp. 360-362.

W. H. Kasner et al., "Electrical Discharge Excited 16 μm CO2 Laser", 1977 IEEE/OSA Conference on Laser Engineering and Applications, Digest of Technical Papers, Jun. 1-3, 1977, p. 12.

*Primary Examiner*—James W. Davie
*Attorney, Agent, or Firm*—Weingarten, Maxham & Schurgin

[57] ABSTRACT

A $CO_2$ medium is optically pumped by a five micron CO laser to the 03'0 level which radiates with 16 micron emission to the 02°0 level. The resulting 16 micron laser finds application in laser uranium enrichment operating to provide excitation of uranium hexafluoride particles. Terminal level blockage, or bottlenecking, in the 02°0 level is optionally avoided for continuous mode operation by 10 micron excitation with a $CO_2$ laser from the 02°0 to the 00°1 level. The $CO_2$ is then diluted by mixing nitrogen gas with it to promote energy transfer to the V=1 vibrational level of the nitrogen, thereby insuring maintenance of the inversion necessary for efficient, high power lasing in the 03'0 to 02°0 transition.

20 Claims, 3 Drawing Figures

CO PUMPED CO₂ 16 MICRON LASER

FIELD OF THE INVENTION

The present invention relates to lasers and in particular to a $CO_2$ laser having 16 micron emissions.

CROSS-REFERENCE TO RELATED APPLICATION

This application is a companion of my application Ser. No. 861,986 filed Dec. 19, 1977, entitled CO₂ LASER EMITTING AT 16 MICRONS IN 02°0-01'0 TRANSITION.

BACKGROUND OF THE INVENTION

One scheme for isotope separation of uranium isotopes based upon photoexcitation of vibrational-rotational bands of uranium hexafluoride can make use of efficiently generated high intensity 16 micron infrared radiation. While gas dynamic lasers are available which provide 16 micron radiation, such as the HBr pumped $CO_2$ laser, or TEA $CO_2/SF_6$ laser, the search continues for efficient and powerful lasers operating in the 16 micron region for use in such applications.

One transition in $CO_2$ gas with an energy difference corresponding to a 16 micron emission occurs between the 03'0 and 02°0 energy levels. While $CO_2$ has a number of vibrational-rotational levels to provide tunability, it may be desirable to increase the tunability through pressure broadening by operating the laser medium at relatively high pressures, typically approaching atmospheric pressure. Prior laser concepts have required operation at a relatively low pressure.

Where continuous or high pulse rate operation is desired, 02°0 level bottlenecking due to stimulated emission or nonradiant transitions, even if some relaxation to the 01'0 level occurs, can reduce lasing efficiency.

BRIEF SUMMARY OF THE INVENTION

In accordance with the teaching of the present invention a $CO_2$ laser emitting in the 16 micron region is provided in which the 03'0 level is pumped by a CO laser at 5 microns permitting 16 micron emission in transitions to the 02°0 level. For continuous or near continuous lasing, bottle-necking at 02°0 is alleviated by a $CO_2$ laser which excites from the 02°0 level to the 00°1 level. Nitrogen gas is added to the $CO_2$ medium which, in the presence of the excited 00°1 level results in an energy transfer to the vibrational-rotational V=1 band of the nitrogen molecules.

BRIEF DESCRIPTION OF THE DRAWING

These and other features of the present invention are more fully described below in the solely exemplary detailed description and accompanying drawing of which.

DETAILED DESCRIPTION OF THE INVENTION

The present invention contemplates method and apparatus for producing 16 micron laser radiation from a $CO_2$ medium using the transition in $CO_2$ from 03'0 to 02°0. In the preferred embodiment, excitation to the 03'0 level is readily achieved using an electron excited CO laser operating within the 5 micron spectral region. At high pulse rate or continuous operation, the 02°0 level is advantageously depopulated using $CO_2$ excitation at 10 microns to the 00°1 level with a subsequent energy transfer to molecules of nitrogen added to the $CO_2$ environment.

Figure 1:
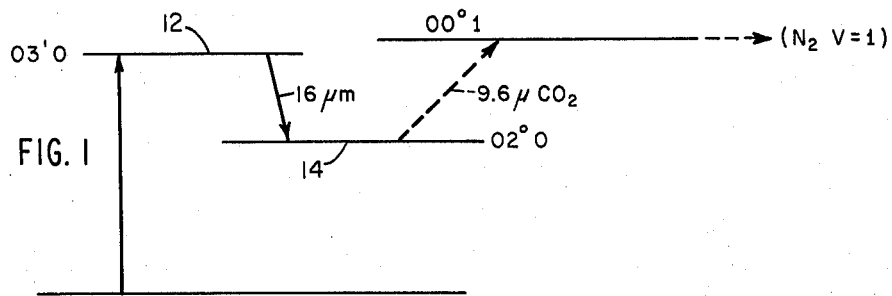
FIG. 1 is an energy level diagram useful in explaining the operation of the present invention.

In particular, by reference to FIG. 1 there is shown an energy level and transition diagram in which the level lines represent level centers. A transition between the 03'0 level 12 and the 02°0 level 14 desired for 16 micron radiation involves an energy step of approximately 647 wave numbers. The maximum gain on vibrational-rotational transitions occurs near 628 wave numbers, as required for use in selective photoexcitation of uranium hexafluoride molecules. In the presence of pressure broadening as is discussed below, the large number of vibrational-rotational levels assure the ability to tune for isotopically selective excitation.

The 03'0 level is shown by tabulations to be approximately 1933 wave numbers above the ground, 00°0 state, and is well within the range of current CO lasers at the point of substantial CO laser efficiency and emission power. This covers the CO transitions V=9 to V=8 through V=5 to V=4. In particular, the 9-8 transition at rotational level P(10) will excite the $CO_2$ to the 03'0 region. Decay from the 03'0 level 12 to the 02°0 level 14 will occur for a properly dimensioned cavity so long as an inversion exists between the levels.

During continuous or high pulse rate operation, the 02°0 level population may increase so as to reduce the population inversion and therefore diminish lasing efficiency. This may be avoided by applying further excitation to elevate the 02°0 level particles to the 00°1 level which is an energy step corresponding to 10 micron $CO_2$ laser radiation. A saturating intensity sufficient to produce equal populations in the 02°0 and 00°1 levels is desired. In addition, nitrogen is added to the $CO_2$ medium such that the 00°1 level collisionally transfers energy to the nitrogen particles, and in particular to the V=1 vibrationally excited level of nitrogen gas. A continuous transfer out of the 02°0 level is then possible, maintaining the population inversion between levels 12 and 14.

Figure 2:
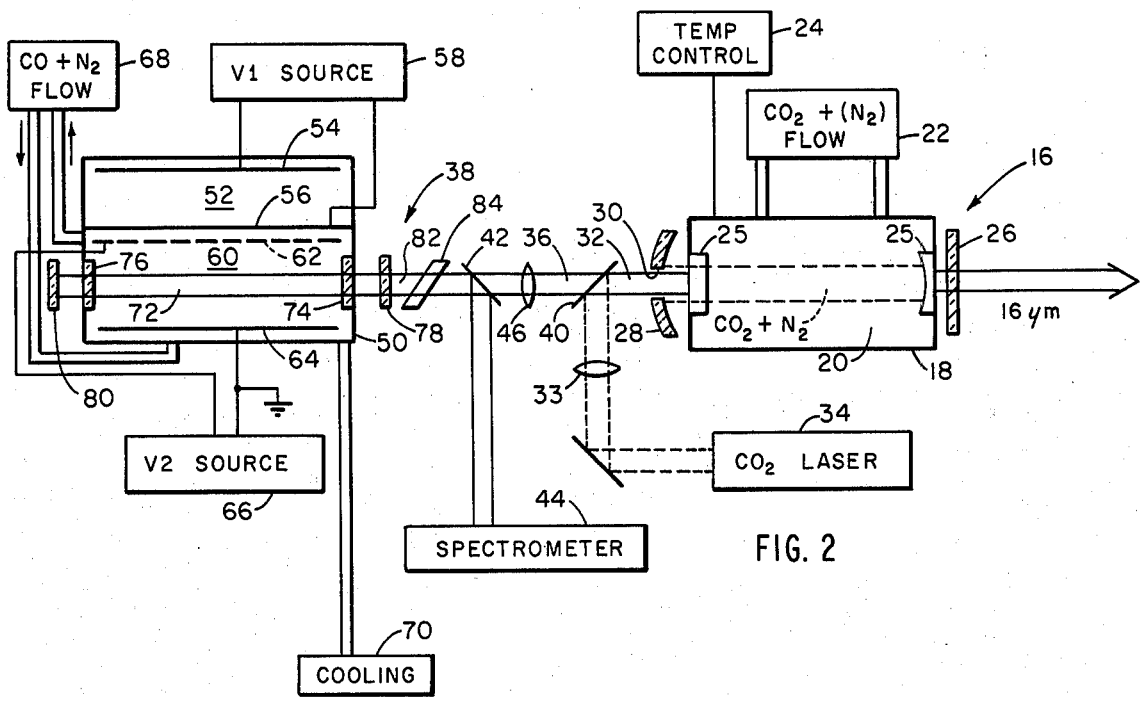
FIG. 2 is a diagram of laser apparatus for use in practicing the present invention.

The apparatus for providing 16 micron radiation as proposed above is illustrated in FIG. 2. As shown there, a $CO_2$ laser 16 has an enclosure 18 within which an interior region 20 has a flowing carbon dioxide environment maintained by a flow system 22. Nitrogen is added where terminal block reduction as described above is desired. The gas is pressurized at approximately 500–760 torr but may range between 1.0 and 1,000 torr depending upon the precise output frequency desired. A temperature controller 24 is provided to maintain the temperature of the $CO_2$ gas at a desired operating temperature, 300° K. being an approximate temperature although other temperatures may be used for optimizing the rotational level populations for maximum gain on the desired transition.

The container for laser 16 has end windows 25 of potassium bromide and preferably set at Brewster's angle. An output mirror 26 which may be of KBr also if desired defines one end of the resonant cavity and a concave metal mirror 28 forms the other end of the cavity. The concave mirror 28 has a central aperture 30 to admit a beam 32 of radiation as described below. The apertured concave mirror 30 is provided for hole coupling the radiation into the enclosure 18, in a stable resonator form.

The beam 32 contains 5 micron radiation in a beam 36 from a CO laser 38 applied through a converging lens 46. Laser 38 is tuned to excite the transition of $CO_2$ to the 03'0 state illustrated in FIG. 1. Where terminal block clearing is desired, beam 36 is superimposed on a beam from an optional $CO_2$ laser 34 by a combining element 40 such as a dichroic mirror or a beam splitter.

The CO laser 38 has a portion of its output beam 36 diverted by a beam splitter 42 to a spectrometer 44 for spectral monitoring of the output of the $CO_2$ laser 38 where desired. The remainder of the beam is converged by lens 46 to enter through the aperture 30 in the mirror 28.

The CO laser 38 is constructed substantially in accordance with the teaching in *Applied Optics*, Volume 14, No. 6, June 1975, page 1290 in an article by McAllister, Draggoo and Eguchi, entitled "Acoustic Wave Effects on the Beam Quality of a High Energy CO Electric Discharge Laser." As shown there, the laser includes a housing 50 with an upper portion 52 comprising an electron source. A cathode 54 and a foil anode 56 are charged by a voltage source 58 to produce electrons in the region 52 and to drive the electrons through the foil anode 56 into a region 60. Region 60 contains a flow of carbon monoxide (CO) gas and has a sustaining field provided between a mesh cathode 62 and an anode 64.

In one embodiment, that of a plasma diode, a gas is provided within the region 52, typically helium, and a voltage across the region 52 of 200 KV over a distance of 10 centimeters is provided by the voltage source 58. In other techniques, region 52 is evacuated, and cathode 54 operated as a hot or cold electron emitter. The voltage between the cathode 62 and the anode 64 is maintained by a voltage source 66 at approximately 1 KV per centimeter over a total distance of 5-10 centimeters. The electrons from region 52 sustain conductivity in region 60 of current which energizes the CO molecules.

The carbon monoxide is preferably mixed with nitrogen or argon and pumped through the region 60 by a pump source 68 at a pressure of approximately 100 torr and a temperature of 100° K. To maintain the gas mixture within the region 60 at a desired temperature, a cooling system 70 is provided to cool a jacket (not shown) around the chamber 50 at a temperature consistent with the 100° K. temperature for the gas within the region 60. The region 60 is bordered on opposite ends of an optical axis 72 with calcium fluoride windows 74 and 76 in the chamber 50 and external mirrors, or gratings 78 and 80 also of calcium fluoride are provided to form a cavity about the optical axis 72, with the mirror 78 acting as an output mirror.

The resulting output beam 82 may be passed through a frequency selective element 84 prior to interception by the spectrometer 44.

Reference is also made to Lacina and McAllister, "Scaling Generalizations for a CO Electric Laser," *IEEE Journal of Quantum Electronics*, Vol. QE11, No. 6, June 1975, pps. 235-241 for techniques to optimize a CO electric laser.

As indicated above, there are several rotational-vibrational bands which may be employed for lasing in the 5 micron range for the CO laser 38. The 9-8 vibrational transition is substantially controlled by the voltage of the source 66 while maintaining the P(10) rotational transition is a function of temperature. Lines other than than the 9-8P(10) transition may be used and will still excite the 03'0 level because it is the only available transition in $CO_2$ in the vicinity of 1933 wave numbers. The spectrometer 44 serves as a convenient monitor to insure that the desired vibrational-rotational band is being excited and producing lasing within the region 60 using known spectrometric techniques, including, as desired, photodetection at the desired line.

The output beam 82 is applied through lens 46 which provides convergence within the chamber 20 to pass through the aperture 30. The beam thus injected, with or without the beam from the $CO_2$ laser 34 through similar focusing lens 33, serves to excite the $CO_2$ to the 16 micron transition. $CO_2$ pulse durations of several microseconds are then possible at useful power levels and repetition rates. Depopulating the lower end of that transition so as to maintain a population inversion is optionally provided by the laser 34 for continuous operation.

Figure 3:
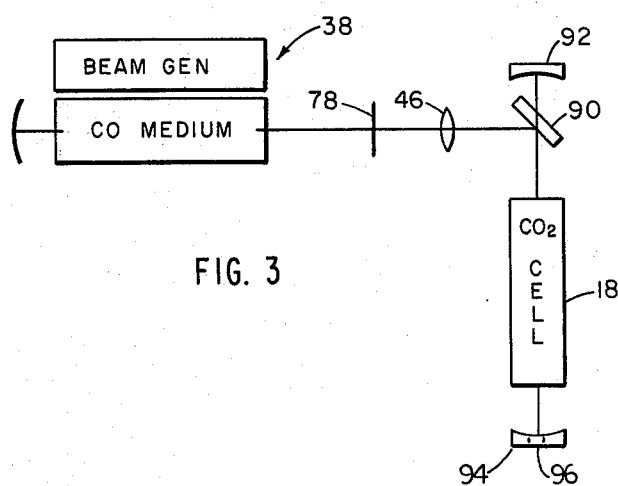
FIG. 3 is a diagram of alternative laser apparatus for use in practicing the present invention.

In an alternative embodiment of FIG. 3, radiation from CO laser 38 is applied to the $CO_2$ laser cell 18 by reflection of a 5 micron mirror 90, transmissive to 16 micron radiation. A cavity for 16 micron radiation from cell 18 is defined by a mirror 92, concave and located beyond mirror 90, in combination with an apertured mirror 94. The aperture 96 of mirror 94 is located along the optical axis as an output port in mirror 94.

The above-described preferred embodiment is intended as exemplary only, the actual scope of the invention being defined only in accordance with the following claims.

What is claimed is:

1. A $CO_2$ laser emitting 16 micron radiation comprising:

a $CO_2$ lasable medium having a transition of approximately 16 micron energy between a first excited state at 02°0 and a second relatively higher excited state 03'0;

means for exciting said medium to said second excited state;

means for inducing a transition between said second and first excited states thereby to produce 16 micron radiation.

2. The laser of claim 1 further including means for depopulating said first excited state to a third excited state thereby to maintain a population inversion between said second and first excited states.

3. The laser of claim 2 wherein said depopulating means includes means for applying radiation of approximately 10 microns to said medium.

4. The laser of claim 3 wherein said depopulating means includes a $CO_2$ laser.

5. The laser of claim 4 wherein said medium includes a gas to which energy is transferred by vibrational excitation from said third excited state.

6. The laser of claim 2 wherein said third excited state includes the 00°1 level.

7. The laser of claim 2 wherein said medium includes a carrier gas to which vibrational excitation is transferred from said third excited state.

8. The laser of claim 7 wherein said gas includes nitrogen.

9. The laser of claim 8 wherein the nitrogen is excited to the V=1 vibrational level.

10. The laser of claim 1 wherein said exciting means includes radiation of approximately 1933 cm$^{-1}$ photon energy.

11. The laser of claim 10 wherein said exciting means includes a CO laser.

12. The laser of claim 1 wherein said exciting means includes a CO laser.

13. The laser of claim 12 wherein said CO laser includes means for producing electrical excitation thereof.

14. The laser of claim 1 wherein said inducing means includes means for producing resonance at 16 microns.

15. A method for providing 16 micron laser radiation comprising the steps of:

exciting a lasable medium having a transition of approximately 16 micron energy between a first excited state at $02°0$ and a second relatively higher excited state $03°0$ to the second excited state; and inducing a transition between the second and first excited states thereby to produce 16 micron radiation.

16. The method of claim 15 further including the step of maintaining a population inversion between the second and first excited states.

17. The method of claim 15 further including the step of depopulating the first excited state to a third excited state thereby to maintain a population inversion between the second and first excited states.

18. The method of claim 17 wherein the depopulating step includes applying radiation of approximately 10 microns to the medium.

19. The method of claim 17 wherein the medium includes a gas and further including the step of promoting energy transfer to the gas by vibrational excitation from the third excited state.

20. The method of claim 17 wherein the third excited state includes the $00°1$ level.

* * * * *